(No Model.)
W. L. JOHNSON.
FILTER.
No. 332,660. Patented Dec. 15, 1885.
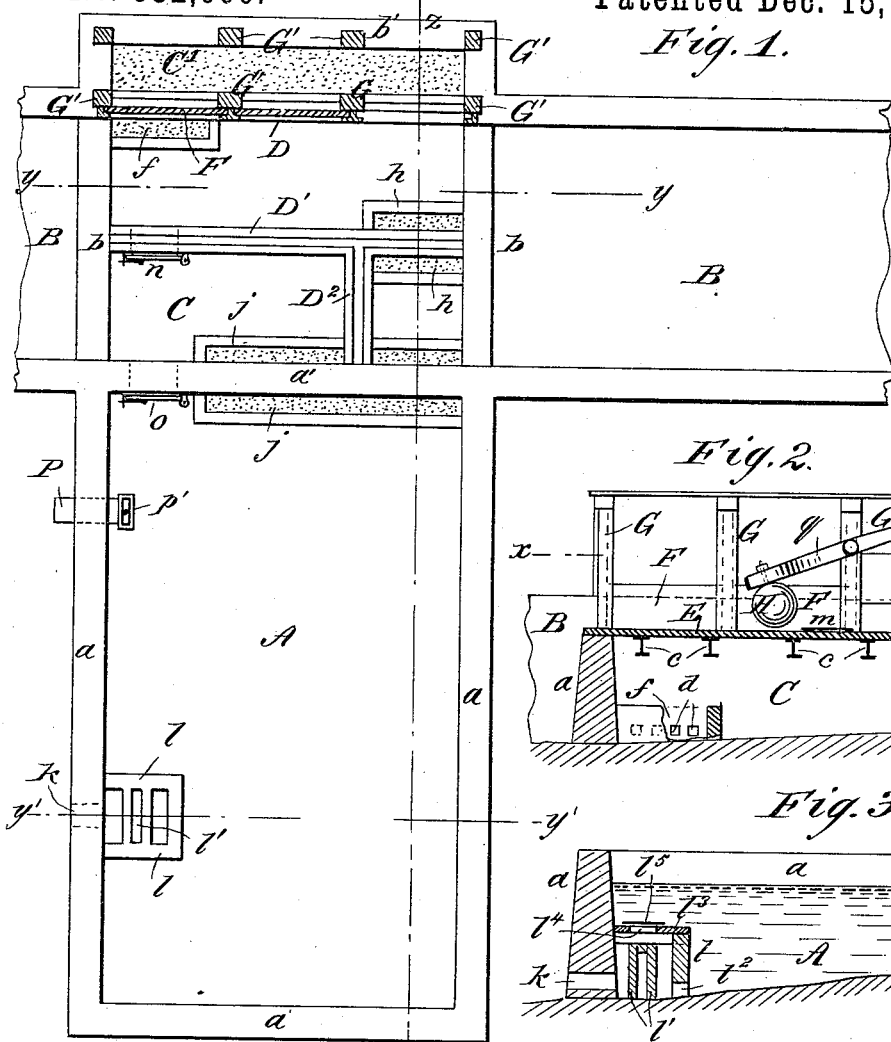
WITNESSES:
Donn Twitchell
C. Sedgwick
INVENTOR:
W. L. Johnson
BY Munn & Co
ATTORNEYS.

UNITED STATES PATENT OFFICE.

WILLIAM L. JOHNSON, OF HACKETTSTOWN, NEW JERSEY, ASSIGNOR TO GEORGE W. JOHNSON, JR., OF SAME PLACE.

FILTER.

SPECIFICATION forming part of Letters Patent No. 332,660, dated December 15, 1885.

Application filed August 22, 1885. Serial No. 175,067. (No model.)

*To all whom it may concern:*

Be it known that I, WILLIAM L. JOHNSON, of Hackettstown, in the county of Warren and State of New Jersey, have invented certain new and useful Improvements in Self-Controlling Reservoirs and Filters, of which the following is a full, clear, and exact description.

My invention has relation to covered overflows and double filters connected with reservoirs, the overflow being arranged to prevent, in time of high water, muddy and impure water from entering the filters and reservoir.

My invention is applicable to distributing-reservoirs, fish-ponds, paper-mills, ice-ponds, and private water-supplies for individual use, and is effective in protecting and purifying the water and keeping it always as clean as may be desired, and, owing to the use of an automatic gate, the superintendent may have no fear of the heaviest freshets, and my invention can be applied in a cheap and economical way, or it may be built on a solid and substantial plan to remain in good condition for many years. The covered overflow is arranged entirely independent of the reservoir, pond, or water-supply, and can be connected or disconnected in a few minutes, and at any time, taking off all strain of a freshet or oversupply of water on the reservoir, thus avoiding risk and expense in guarding the reservoir.

Reference is to be had to the accompanying drawings, forming part of this specification, in which similar letters of reference indicate corresponding parts in all the figures.

Figure 1 is a sectional plan view of my invention, taken on the line $x\ x$, Fig. 2, the overflow-bridge being removed. Fig. 2 is a sectional elevation taken on the line $y\ y$ of Fig. 1. Fig. 3 is a sectional elevation of the reservoir on the line $y'\ y'$ of Fig. 1, and Fig. 4 is a longitudinal sectional elevation taken on the line $z\ z$ of Fig. 1.

A represents an excavated reservoir inclosed by masonry walls $a\ a'$, and B B represent a race or the bottom of a stream or other source of water-supply. In line with the wall $a'$ of the reservoir A, and in line with the race B the earth is excavated to form the filter-pit C. This pit is inclosed by the said wall $a'$ and the masonry walls $b$ and $b'$, the latter of which is offset from the outer edge of the race B, to form the primary filter-pit $C'$. (Shown clearly in Fig. 1.) A short distance from the wall $b'$ is built the hollow wall D, of masonry, of less height than the walls $a'\ b'$, and midway between the wall D and the wall $a'$ is built the hollow masonry wall D', of the same height as the wall D, and in these walls D D' are fitted the cross ties or stringers $c\ c$, on which the overflow or bridge E over the filter-pit C is built. The said bridge or overflow E is made as near water-tight as possible, and serves to convey all the water from the race B over the pit C, except that which enters the primary filter $C'$ through one or more of the gates, F F'. These gates F F' are held by and are adapted to slide vertically in the uprights G G, immediately over the wall D; and in order to house the primary filter $C'$, I extend these uprights G and erect corresponding uprights, $G'$, on the wall $b'$, and on these uprights G G', I place the roof $G^2$, as shown in Fig. 4. The wall D, that separates the primary filter-pit $C'$ from the main pit C, is perforated near its bottom, as shown at $d$, Fig. 2, through which the water passes, and about these openings is built a small wall or pocket, $f$, in which filtering material is packed. The wall D' divides the main filter-pit C into two equal compartments, and this wall is perforated near its base with the passages or openings $g$, for the passage of water, and about these openings are built two pockets, $h\ h$, one on each side of the wall, to receive filtering material, as shown clearly in Figs. 1 and 4. The wall $a'$ is perforated at its base with the openings $i$, for water to enter the reservoir A from the main filter-pit C, and about these openings $i$ are built two pockets, $j\ j$, one on each side of the wall, to receive filtering material, as shown in Figs. 1 and 4.

The water is dispensed from the reservoir A through the outlet-opening $k$, and around this opening is built, upon the inside of the reservoir, the box-wall $l$, with the division-wall $l'$. (Shown in Figs. 1 and 3.) The wall $l$ has the opening $l^2$ at the bottom, and the division-wall $l'$ is of less height than the wall $l$, and upon the wall $l$ is placed the plate $l^3$, so the water in order to reach the outlet $k$ has to take a circuitous course, as indicated by the arrow in Fig. 3, which prevents too rapid flow of water from the reservoir. The cover $l^3$ may be made removable, or a man-hole, $l^4$, may be made through it and covered by a lid, $l^5$, so that when the reservoir is to be flushed out for cleaning it, by removing the cover $l^3$ or the lid $l^5$, a perfectly-free flow of water from the reservoir may be secured. The bridge E and the walls D' a' each have a man-hole, (marked, respectively, $m, n, o,$) all of which are opened at the time of "flushing out," so the water will flow directly from the race B into and through the main filter-pit C, and thence to and through the reservoir A.

When all the water from the reservoir A is to be drained out, the valve $p$ in the drain-pipe P is lifted by rod $p'$ to open the pipe.

The gates F during low water may be lifted by hand to increase the flow of water into the primary filter-box C', if desired; but these gates ordinarily will be kept closed. The gate F' has a float, H, attached to it by the lever $q$ and link $q'$, the lever being fulcrumed to one of the uprights G, so that normally or during low or ordinarily high water the weight of the long arm of the lever and the float H will hold the gate F' open or elevated, so that a proper supply of water will pass from the bridge E through the gate into the primary filter C' and find its way through the filtering material in this filter, and also through the small filters $f\ h\ j$ to the reservoir A; but during high water or a freshet, when muddy water comes down, the float H will be buoyed up by the water passing over the bridge E, so as to close the gate F', which will cause all the water to pass over the bridge E and effectually prevent muddy water from entering the filter and reservoir. In this manner the reservoir is rendered self-controlling, and all danger of filling the filter and reservoir with foul water is avoided, and, besides this, no water enters the reservoir A unfiltered, and there is no danger of straining the filter or reservoir.

In some cases I shall build the short wall $D^2$ from the wall D' to the wall $a'$; but this may be omitted, if desired.

Having thus described my invention, I claim as new, and desire to secure by Letters Patent—

1. The platform E, over which the water flows, the pit C, formed under it, the reservoir A on one side of the pit C and connected therewith, the filter-reservoir C' on the other side of the pit C and connected therewith, in combination with an automatic gate F', arranged at one edge of the platform E and controlled by the water flowing over the same for regulating the supply of water entering the filter-pit C', substantially as and for the purpose described.

2. The platform E, over which the water flows, the pit C formed under it, the reservoir A on one side of the pit C and connected therewith, the filter-pit C', formed on the other side of the pit C and connected therewith, in combination with the gate F', arranged at one edge of the platform E, and provided with the lever $q$, and float H, arranged to be lifted for closing the gate F' during high water, substantially as and for the purpose set forth.

WILLIAM L. JOHNSON.

Witnesses:
 W. D. METTLER,
 W. S. RITTENHOUSE.